United States Patent
Garcia et al.

(10) Patent No.: US 7,410,440 B2
(45) Date of Patent: Aug. 12, 2008

(54) METHOD FOR CONVERTING A NON-DRIVEN TAG AXLE SYSTEM TO A DRIVEN AXLE SYSTEM

(75) Inventors: Francisco Garcia, Kalamazoo, MI (US); Leo Wenstrup, Portage, MI (US); Dale Lee Kwasniewski, Galesburg, MI (US); Steve Slesinski, Kalamazoo, MI (US)

(73) Assignee: Dana Heavy Vehicle Systems Group, LLC, Toledo, OH (US)

( * ) Notice: Subject to any disclaimer, the term of this patent is extended or adjusted under 35 U.S.C. 154(b) by 0 days.

(21) Appl. No.: 11/803,250

(22) Filed: May 14, 2007

(65) Prior Publication Data

US 2007/0219040 A1    Sep. 20, 2007

Related U.S. Application Data

(62) Division of application No. 10/971,750, filed on Oct. 22, 2004, now Pat. No. 7,232,398.

(51) Int. Cl.
*F16H 48/06* (2006.01)
*B21K 21/16* (2006.01)

(52) U.S. Cl. .............. 475/222; 475/221; 29/401.1

(58) Field of Classification Search ............. 475/202, 475/206, 221, 222, 225, 223; 180/247, 248, 180/249; 29/401.1, 426.1, 469
See application file for complete search history.

(56) References Cited

U.S. PATENT DOCUMENTS

| 3,611,832 | A  | * | 10/1971 | Vollmer    | 475/198 |
| 4,499,791 | A  | * | 2/1985  | Brisabois  | 475/71  |
| 4,745,986 | A  | * | 5/1988  | Hanenberger| 180/233 |
| 5,429,204 | A  | * | 7/1995  | Tuholski   | 180/247 |
| 6,863,634 | B2 | * | 3/2005  | Holman et al. | 475/221 |
| 7,306,536 | B2 | * | 12/2007 | Ziech      | 475/221 |

* cited by examiner

*Primary Examiner*—Roger Pang
(74) *Attorney, Agent, or Firm*—Marshall & Melhorn, LLC

(57) ABSTRACT

A method for converting a non-driven tag axle system to a driven axle system is disclosed where a forward driven axle system is converted to drive an interaxle drive shaft. The interaxle drive shaft is connected to a drive axle head mounted within the tag axle housing. Drive axles are connected to drive axle head. In another embodiment, a forward driven axle system is removed from a first position on the vehicle frame and the tag axle is removed from a second position on the vehicle frame. A differential is installed in the tag axle and it is located in the first position. The forward driven axle system is located in the second position and connected to the differential in the first position.

10 Claims, 10 Drawing Sheets

METHOD FOR CONVERTING A NON-DRIVEN TAG AXLE SYSTEM TO A DRIVEN AXLE SYSTEM

RELATED APPLICATIONS

This is a divisional application filed off of U.S. patent application Ser. No. 10/971,750 filed on Oct. 22, 2004 now U.S. Pat. No. 7,232,398, which is incorporated by reference in its entirety herein. This divisional is being filed during the pendency of U.S. patent application Ser. No. 10/971,750.

FIELD OF THE INVENTION

The present invention relates to method of converting a non-driven tag axle system to a driven axle system in a tandem axle system.

BACKGROUND OF THE INVENTION

Single drive axle trucks with a tag axle are known for their lighter weight, improved fuel economy, low installation cost and reliability in operations over tandem drive axle configurations. The North American truck market, however, is dominated by the tandem drive axle configuration in part due to single drive axle trucks having a low resale value. The low resale value can be partly attributed to the high cost associated with converting a single drive axle truck to a tandem drive axle truck. Conversion costs can be high since current tag axles have a different profile and wheel equipment than the drive axle, thus requiring a retrofitter to discard the tag axle, the suspension bracketry and the wheel equipment and install a new drive axle, suspension bracketry and wheel equipment.

In light of the disadvantages of the prior art, it would be advantageous to convert a non-driven tag axle to a driven axle by re-using much of the original equipment of the vehicle. It would also be advantageous to provide the vehicle with a tag axle assembly and a driven axle assembly that have substantially identical profiles that they can be interchanged with one another. It would also be advantageous for a truck fleet owner to have the ability to purchase a single drive axle truck and then later convert it to a tandem drive axle truck for resale.

SUMMARY OF THE INVENTION

The present invention is directed toward a method for converting a single drive axle vehicle to a tandem drive axle vehicle. The method includes providing a tag axle system comprising a tag axle housing, a removable cover plate attached to the tag axle housing and a pair of hollow, radially extending arms with a closure in each arm. A forward driven axle system is also provided comprising a forward axle assembly located in a forward axle housing and driving a stub shaft assembly. The axle housing has a closure in an output shaft aperture. The forward axle assembly is replaced, including the stub shaft assembly, with a forward rear axle assembly. The cover plate of the tag axle housing is removed and a drive axle head assembly is installed into the tag axle housing. The closure in the output shaft aperture is removed and an output shaft is installed through the aperture. The output shaft is connected between the forward rear axle assembly and the drive axle head assembly. Additionally, the closures in each arm of the tag axle system are removed and axles connected to the drive axle head assembly are inserted.

The present invention is also directed toward an additional method of converting a single drive axle vehicle to a tandem drive axle vehicle including providing a tag axle and a driven axle of a tandem axle system, where the tag axle comprises a bowl having two hollow, radially extending arms. The driven axle is connected to an engine with a rotatable drive shaft. The tag axle is removed from a rear position on the vehicle frame and a differential assembly is mounted within the bowl of the tag axle. A left axle shaft and a right axle shaft are installed within the hollow arms and the shafts are connected to the differential assembly. The driven axle is removed from the front position on the vehicle frame. The tag axle, with the differential assembly and the left and right axle shafts, is installed in the front position on the vehicle frame and the differential assembly is attached to the drive shaft. The driven axle is then installed in the rear position on the vehicle frame and connected to the differential of the tag axle.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
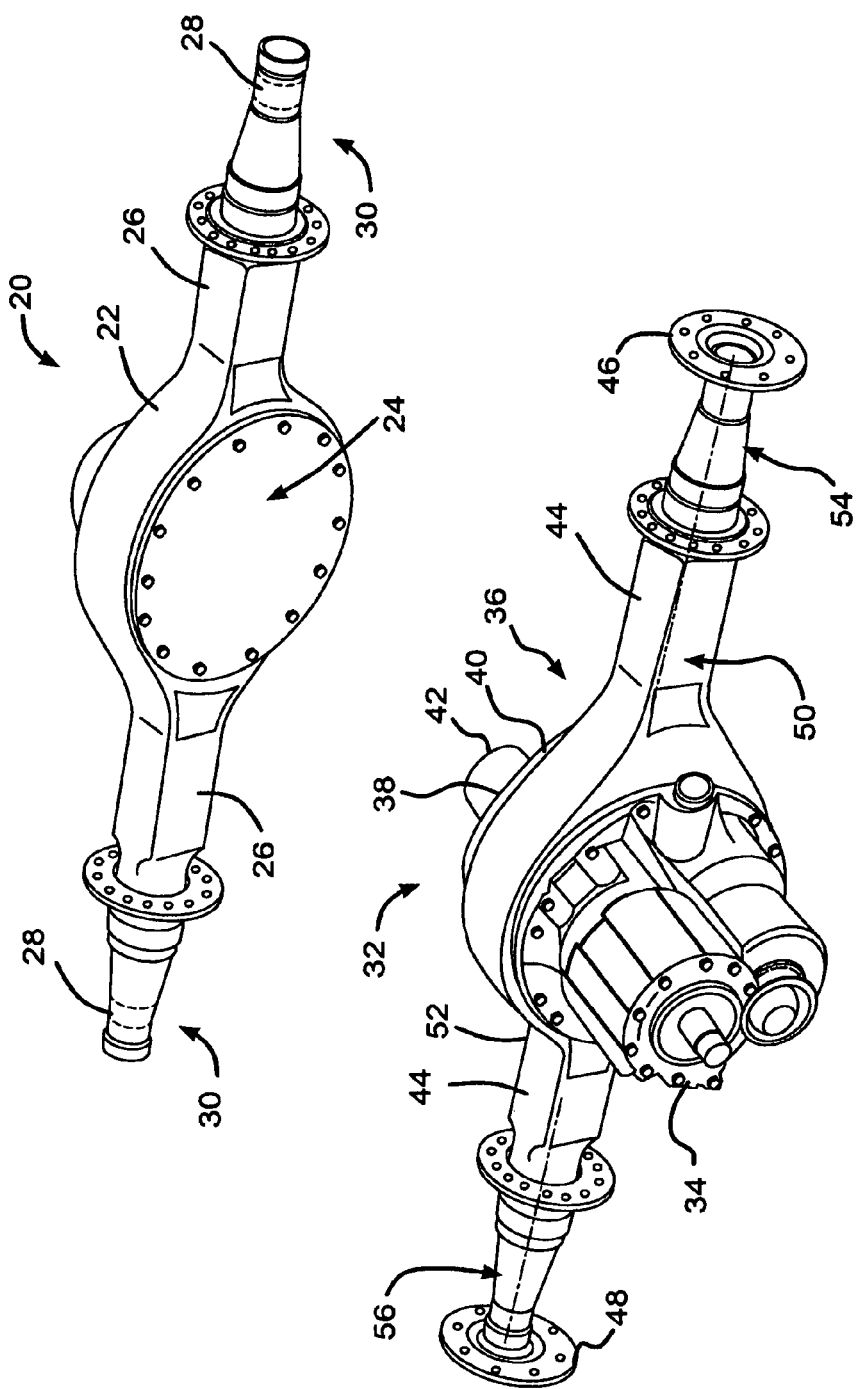
FIG. 1 is a schematic view of a drive axle system and a tag axle system of the present invention.

Referring now to FIG. 1, a tag axle system 20 having a tag axle housing 22, a removable cover 24 attached to the tag axle housing 22 and a pair of hollow, radially extending arms 26 secured to the housing 22 is depicted. In the preferred embodiment, at least two closures 28 are located in each arm 26 to prevent, or reduce, lubricant from escaping. The closures 28 are preferably removeable from each arm 26.

At least one wheel (not shown) is rotatably attached to an outboard portion 30 of each radially extending arm 26. At least one tire (not shown) is mounted on the at least one wheel, as known by those skilled in the art.

FIG. 1 also depicts a forward driven axle system 32 having a forward axle differential assembly 34 located in a forward axle housing 36. Preferably, the forward axle housing 36 has an aperture 38 located in a rear covering 40. A selectively removeable closure 42 is fitted within the aperture 38 of the rear covering 40.

The forward driven axle system 32 has a pair of hollow, radially extending arms 44 secured to the housing 36 that rotatably house a first axle shaft 46 and a second axle shaft 48. A first end 50 of the first axle shaft 46 is drivingly connected to the forward axle differential assembly 34. A first end 52 of the second axle shaft 48 is drivingly connected to the forward axle differential assembly 34. A second end 54 of the first axle shaft 46 has at least one wheel (not shown) rotatably attached thereto. At least one tire (not shown) is mounted to the wheel as known by those skilled in the art. A second end 56 of the second axle shaft 48 has at least one wheel (not shown) rotatably attached thereto. At least one tire (not shown) is mounted to the wheel, as known by those skilled in the art.

Figure 2:
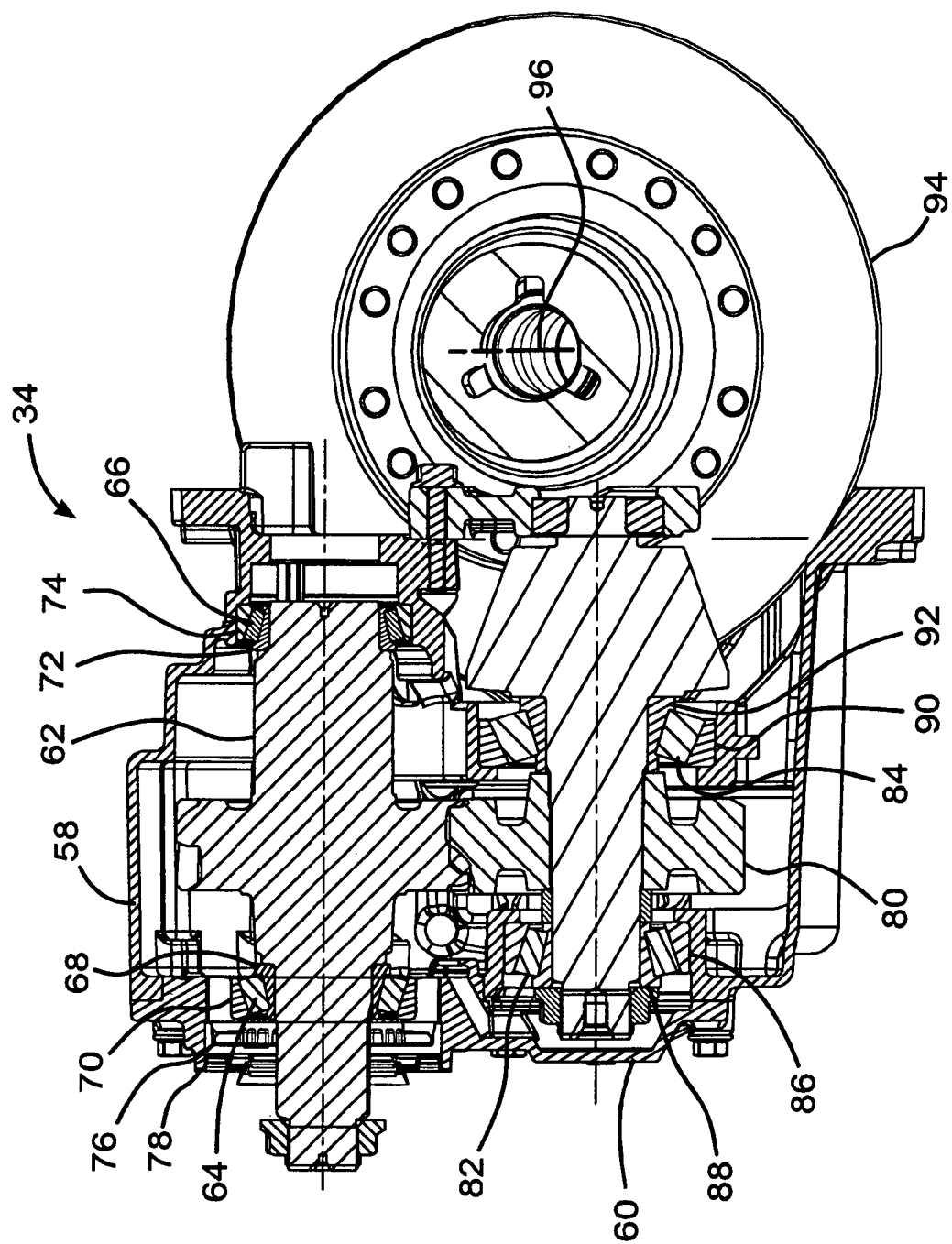
FIG. 2 is side view of an original component of the drive axle system.

One embodiment of the forward axle differential assembly 34 is depicted in FIG. 2. In the depicted embodiment, the forward axle differential assembly 34 is a high entry forward axle assembly, as known to those skilled in the art, although other axle assemblies are within the scope of the present invention. The forward axle differential assembly 34 is housed within a differential case 58. The case 58 may be constructed of a single piece or it may be constructed of multiple pieces joined together by a plurality of bolts. A differential carrier cover 60 is typically also secured to the differential case 58.

A stub shaft 62 is rotatably mounted within the differential case 58 on at least a first bearing 64 and a second bearing 66. The first bearing 64 is secured between a bearing cone 68 and a bearing cup 70 and the second bearing 66 is secured between a bearing cone 72 and a bearing cup 74. Additional bearings, bearing cups and bearing cones, or other antifriction means known to those skilled in the art are well within the scope of the present invention.

An input adjuster cup assembly 76 is provided adjacent the first bearing 64 for adjusting the position of the bearing 64 as known to those skilled in the art. A lubricant seal 78 is located axially adjacent the input adjuster cup assembly 76 for preventing lubricant from escaping from the differential case 58.

The stub shaft 62 is rotatably connected to a helical pinion gear 80. The helical pinion gear 80 is rotatably mounted within the differential case 58 by at least a third bearing 82 and a fourth bearing 84. The third bearing 82 is secured within a bearing cup 86 and a bearing cone 88 and the fourth bearing 84 is secured within a bearing cup 90 and a bearing cone 92. The helical pinion gear 80 is rotatably connected to a ring gear 94. The helical pinion gear 80 can be aligned with the rotational axis 96 of the ring gear 94 or it may be offset from the rotational axis 96 of the ring gear 94, as depicted in FIG. 2.

The first axle shaft 46 and the second axle shaft 48 are connected to the ring gear 94 with a plurality of side gears (not shown), as known to those skilled in the art. The first and second axle shafts 46, 48 are rotationally mounted within the differential case 58 on at least two bearings (not shown).

Figure 3:
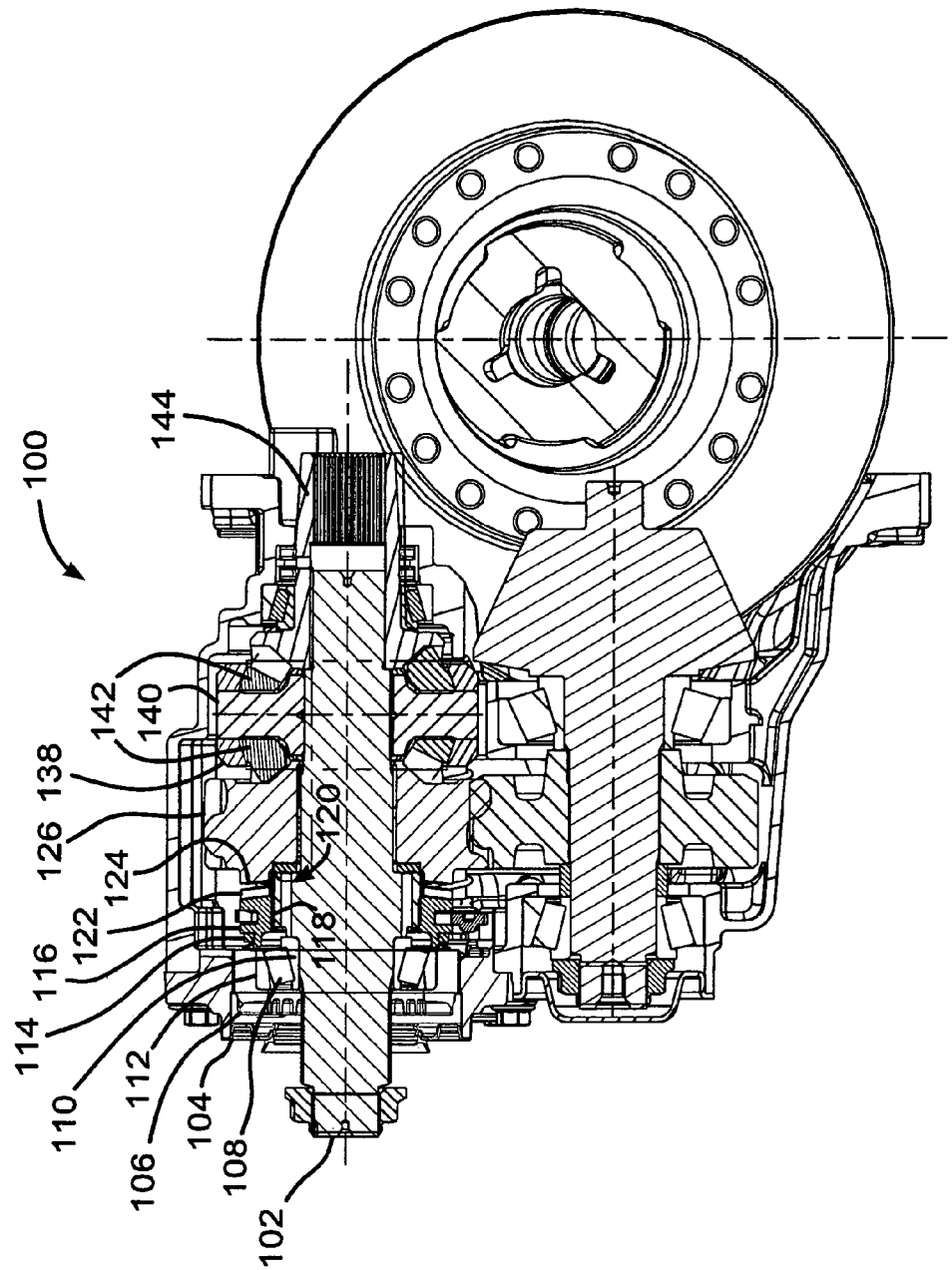
FIG. 3 is a side view of the component of FIG. 2 modified according to the present invention.

According to a preferred embodiment of the method of the present invention, the forward axle differential assembly 34 is converted to a forward rear axle differential assembly 100 by removing the stub shaft 62 and installing an input shaft 102 and interaxle differential components, as shown in FIG. 3, in its place. A new lubricant seal 104, input adjuster cup assembly 106 and first bearing 108, with a new bearing cone 110 and bearing cup 112, are preferably installed, although in some circumstances the originals may be reused unless they are worn or otherwise damaged.

Figure 4:
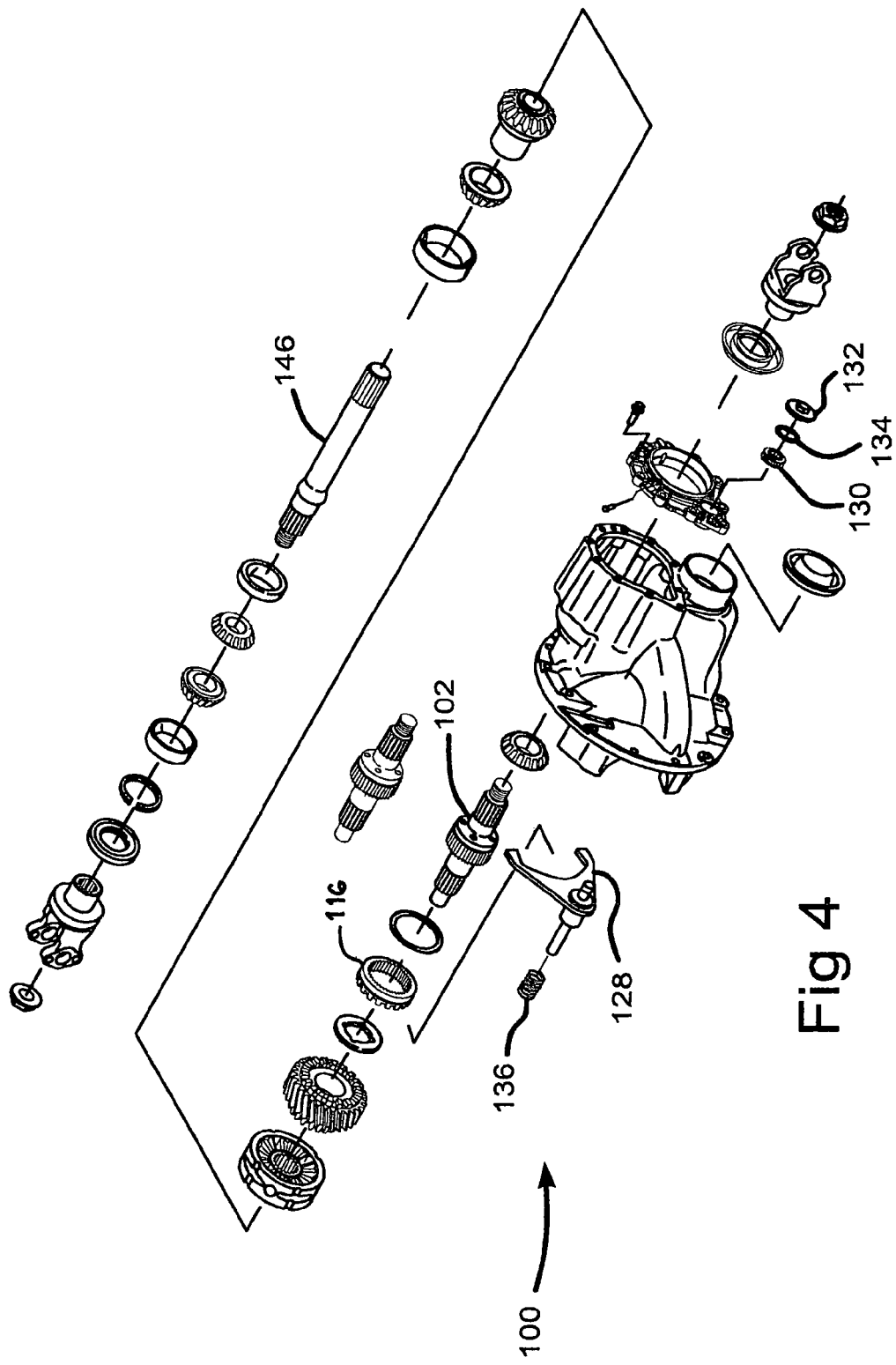
FIG. 4 is an exploded, schematic view of some of the components used to modify the component of FIG. 2.

A second lubricant seal 114 is added adjacent a lock out clutch 116, as best seen in FIG. 3. The clutch 116 is slidingly mounted a plurality of splines 118 located on a raised diameter portion 120 of the input shaft 102. The clutch 116 has a plurality of circumferentially disposed teeth 122 which selectively engage with a corresponding set of teeth 124 on an adjacent helical side gear 126. The teeth 122 on the clutch 116 are urged into engagement with the teeth 124 on the helical side gear 126 by a shift fork 128, best seen in FIG. 4, that moves the clutch 116 in a first axial direction. The shift fork 128 is axially translated by a fluid driven piston 130 which is moved in response to a fluid pressure shift signal. A piston cover 132 and piston o-ring 134 are secured to the piston 130 for sealingly enclosing at least a portion of the piston 130. At least one coil spring 136, in contact with the shift fork 128, urges the shift fork 128 in a second axial direction, opposite the first axial direction.

Those skilled in the art will appreciate that engaging the teeth 122 on the clutch 116 with the teeth 124 on the helical side gear 126 will engage an interaxle differential assembly 138, depicted in FIG. 3. If the clutch 116 and the side gear 126 are not engaged, the power from the input shaft 102 will be transmitted to the axle behind the forward rear axle differential assembly 100. The clutch 116 allows power to be selectively provided to the axle with the most available wheel traction.

The interaxle differential assembly 138 has a spider 140 connected to the input shaft 102. The spider 140 has at least a pair of oppositely disposed differential gears 142 which on one side engage with an output side gear 144 and on the other side engage with the helical side gear 126. The output side gear 144 is connected to an output shaft 146, best seen in FIG. 5. A bearing assembly comprising of at least one bearing ring 148, at least one bearing cup 150 and at least one bearing cone 152 are located about the output shaft 146 to facilitate its rotation. The output shaft 146 is connected to an output yoke 154.

Figure 6:
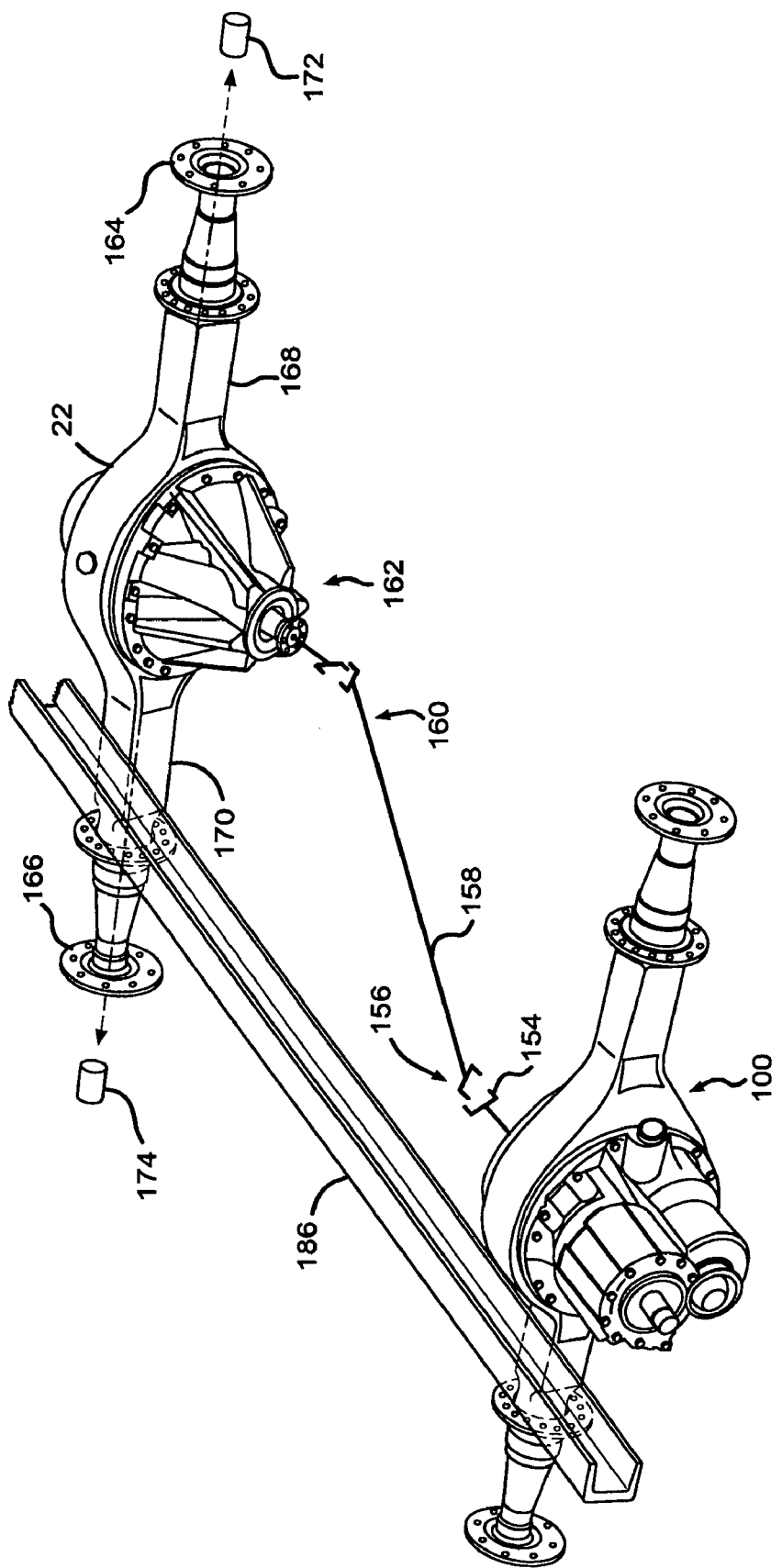
FIG. 6 is a schematic, perspective view depicting a step of the present invention.
Figure 7:
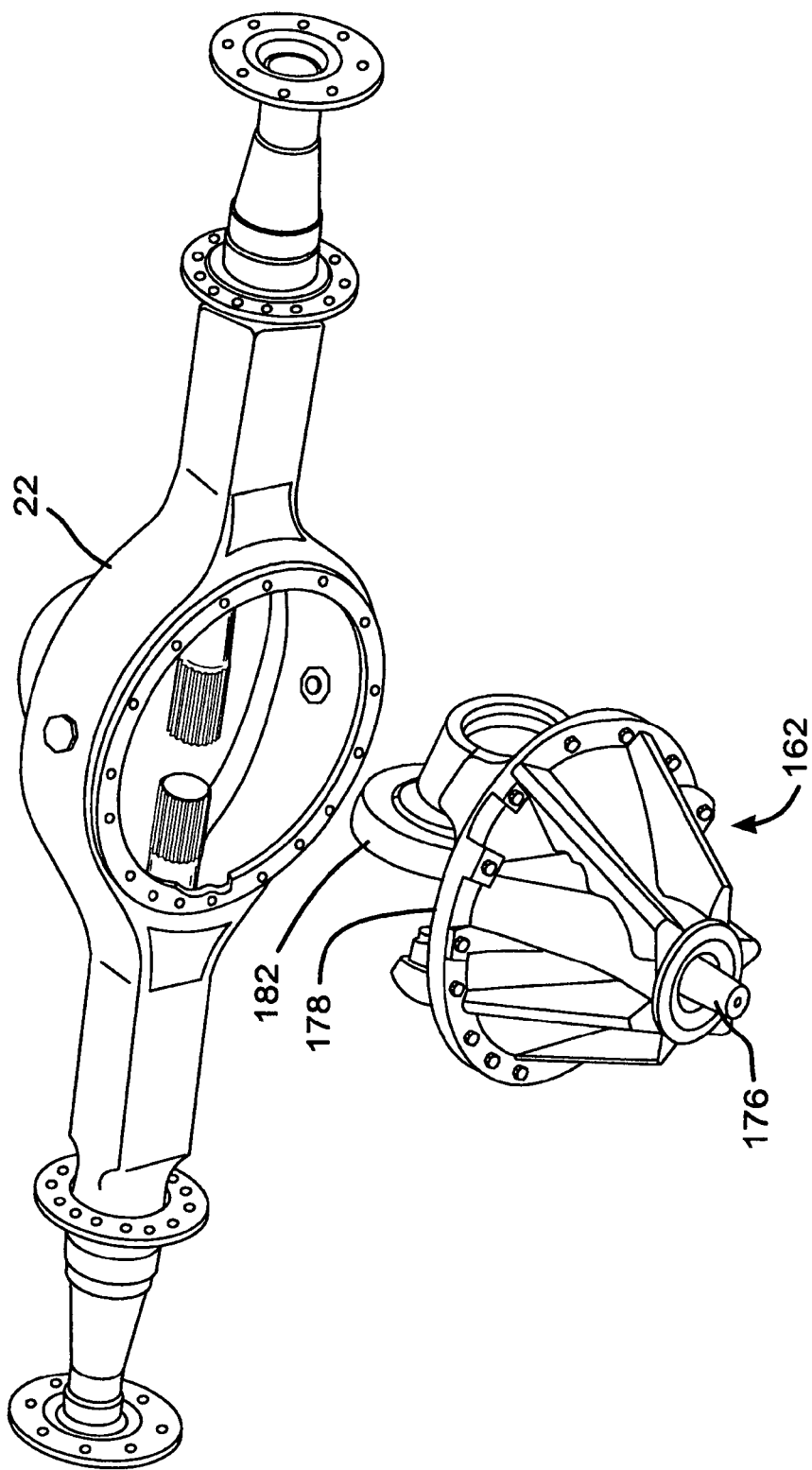
FIG. 7 is a schematic, perspective view depicting yet another step of the present invention.

The output yoke 154 is connected to a first end 156 of an interaxle drive shaft 158, as shown in FIG. 6. A second end 160 of the interaxle drive shaft 158 is connected a drive axle head assembly 162 that has been located within the tag axle housing 22. The drive axle head assembly 162 is located within the tag axle housing 22 by removing the cover 24 on the original tag axle system 20 and positioning the assembly 162 within the housing 22, as shown in FIG. 7. Referring back to FIG. 6, the drive axle head assembly 162 provides drive to wheels (not shown) supported on either side of the assembly 162 on a first axle shaft 164 and a second axle shaft 166 located within a first radially extending arm 168 and a second radially extending arm 170, respectively. A first closure 172, located in the first radially extending arm 168 to prevent wheel bearing lubricant from entering the tag axle housing 22, is removed prior to installation of the first axle shaft 164. A second closure 174 located within the second radially extending arm 170, also present to prevent wheel bearing lubricant from entering the tag axle housing 22, is removed prior to installation of the second axle shaft 166. The assembly 162 may include a pinion assembly 176 and a differential gear assembly 178, as known to those skilled in the art for driving a rear axle of a tandem axle system.

The pinion shaft assembly 176 is provided to transfer torque from the interaxle drive shaft 158 to the differential gear assembly 178. The differential gear assembly 178 allows the wheels supported on either side of the axle assembly 178 to rotate at different speeds. The assembly 178 includes a pinion gear (not shown), a ring gear 182 and a conventional bevel gear set (not shown). The pinion gear transfers torque from the interaxle drive shaft 158 to the ring gear 182. The ring gear 182 transfers torque from the pinion gear to the bevel gear set and is convention in the art.

The tag axle system, described above, is then located back in its original position behind the first axle 46 on a frame 186, as shown in FIG. 6. Those skilled in the art will appreciate that torque provided by a prime mover, such as an internal combustion engine (not shown), is transferred to the input shaft 102 of the forward rear axle differential assembly 100. The torque is divided within the forward rear axle differential assembly 100 for driving the wheels associated therewith and part of the torque is transferred to the interaxle drive shaft 158. The interaxle drive shaft 158 transmits torque to the drive axle head assembly 162 which in turn drives the wheels associated therewith.

Figure 8:
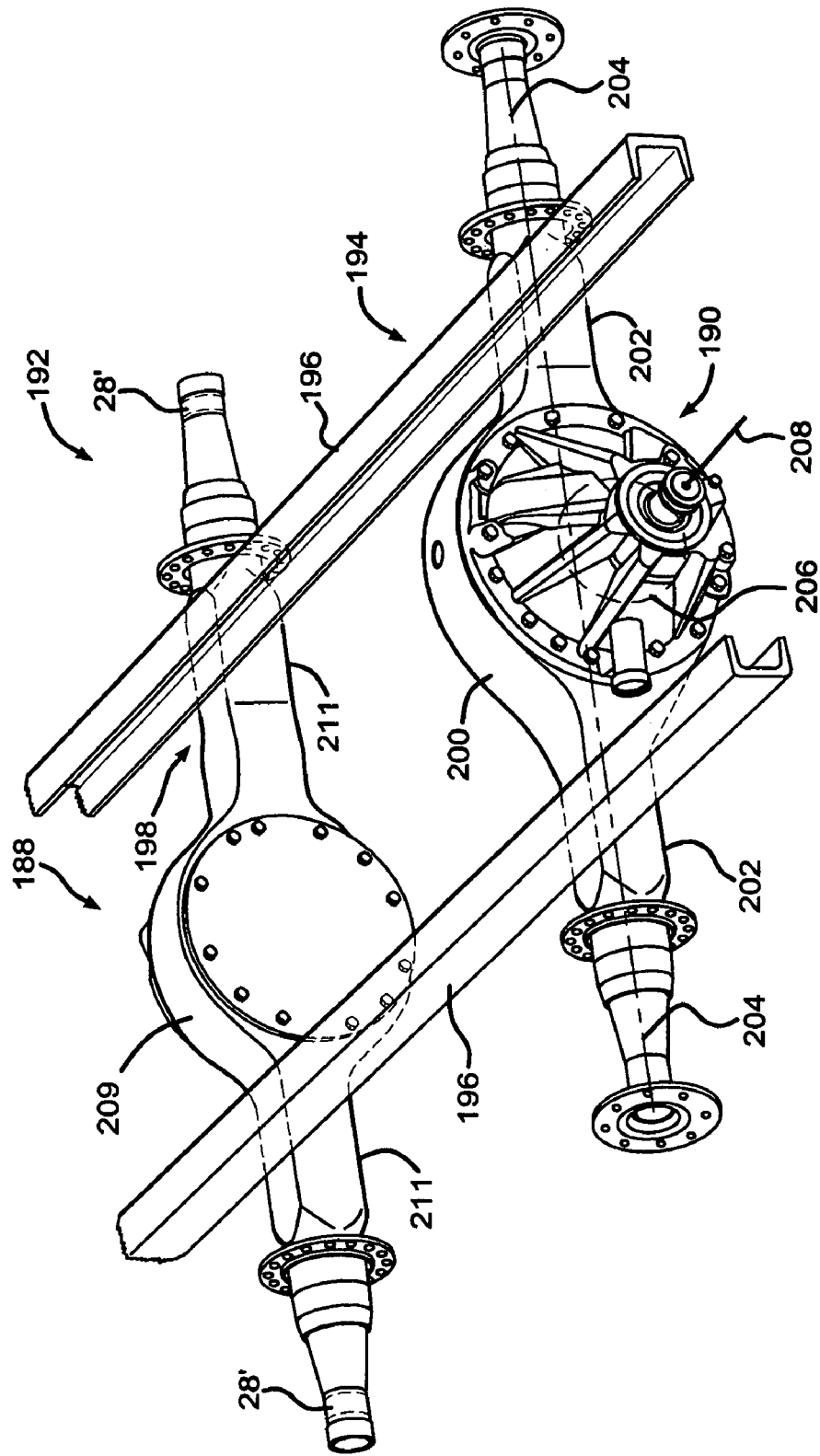
FIG. 8 is a schematic, perspective view of a drive axle system and a tag axle system of an alternative embodiment of the present invention.

An alternative embodiment of the present invention is depicted in FIG. 8 and comprises a tag axle system 188 located behind a driven axle system 190 of a tandem axle system 192. The driven axle system 190 is mounted in a first position 194 on a vehicle frame 196 and the tag axle system 188 is located in a second position 198 behind the first position 194 on the vehicle frame 186.

The driven axle system 190 has a bowl 200 with two radially extending arms 202 connected thereto. Axle shafts 204 are located within each of the radially extending arms 202. The axle shafts 204 are drivingly connected to a differential 206 housed within the bowl 200 of the driven axle system 190. The differential 206 may be such as differential 34 described above and depicted in FIG. 2, however, differential 206 is not limited to solely this embodiment.

The driven axle system 190 is connected to a prime mover, such as an internal combustion engine (not shown), with a rotatable drive shaft 208.

The tag axle system 188 has a bowl 209 originally fitted with no differential and two substantially hollow arms 211 that radially extend from the bowl 209. Preferably, the tag axle system 188 has a substantially similar shape and size as the driven axle system 190. More specifically, the bowl 209 and the arms 211 of the tag axle system 188 may have substantially the same exterior profile as the bowl 200 and the arms 202 of the driven axle system 190.

Closures 28' may be located in each arm 211 to prevent, or reduce, lubricant within the bowl 209 and/or in the arms 211 from escaping. The closures 28' are preferably removably located in each arm 211.

Figure 9:
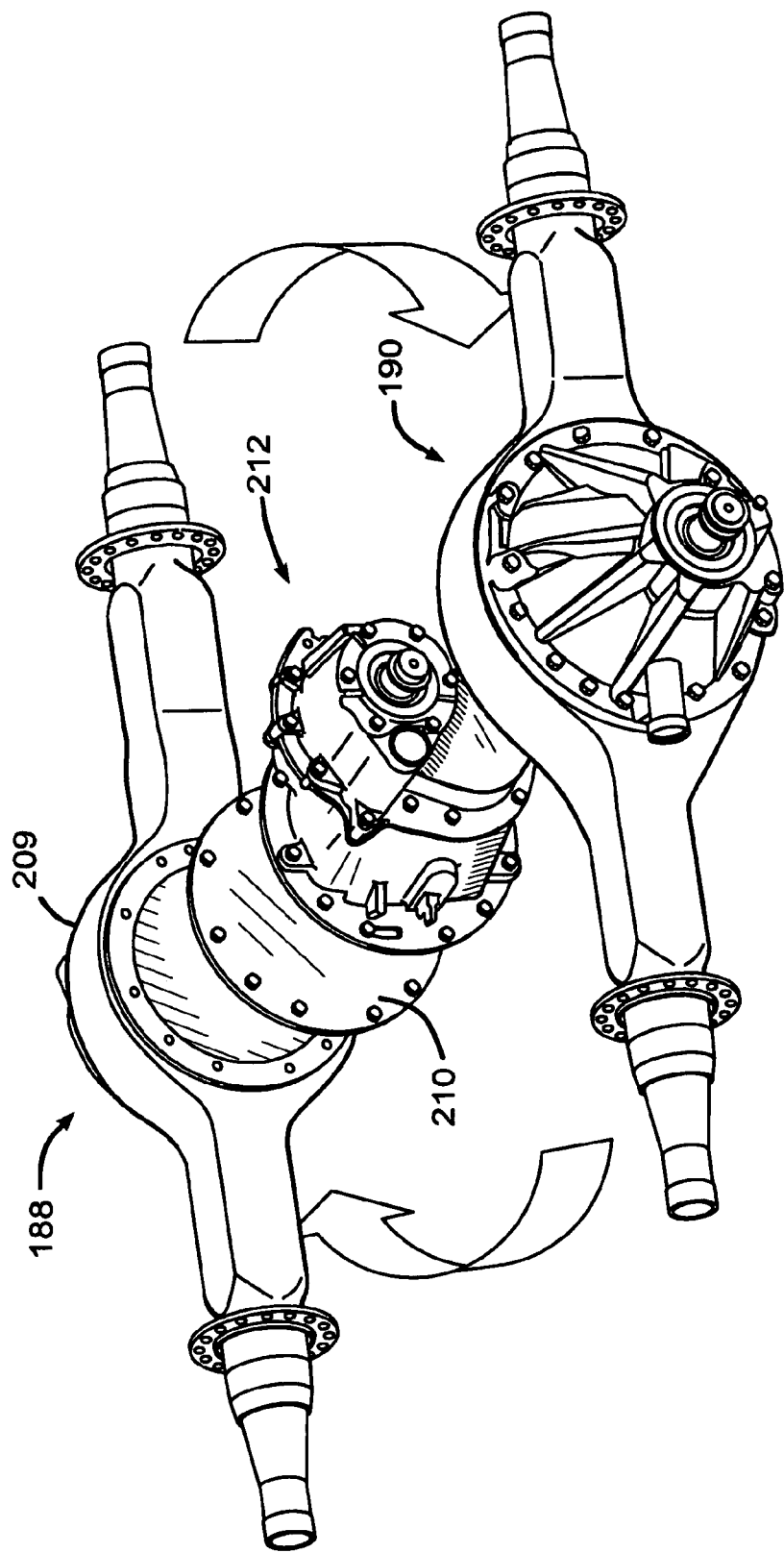
FIG. 9 is a schematic, perspective view of a step of the process of the alternative embodiment of the present invention.

Looking now at FIGS. 8 and 9, the driven axle system 190 is removed from its first position 194 on the frame 196 and the tag axle system 188 is removed from its second position 198 on the frame 196. A cover 210 on the bowl 209 of the tag axle system 188 is removed and a forward rear axle differential assembly 212 is installed within the bowl 209. In the preferred embodiment, the bowl 209 has been pre-machined to accept the forward rear axle differential assembly 212.

The forward rear axle differential assembly 212 is adapted to drive wheels (not shown) supported on either side of the differential assembly 212. Preferably, the forward rear axle differential assembly 212 is identical to, or very similar to, the high entry forward rear axle differential assembly 100 described above. Those skilled in the art will appreciate that other forward rear axle differential assemblies, other than as described above, may be used in order to provide an assembly designed for a specific application.

Figure 10:
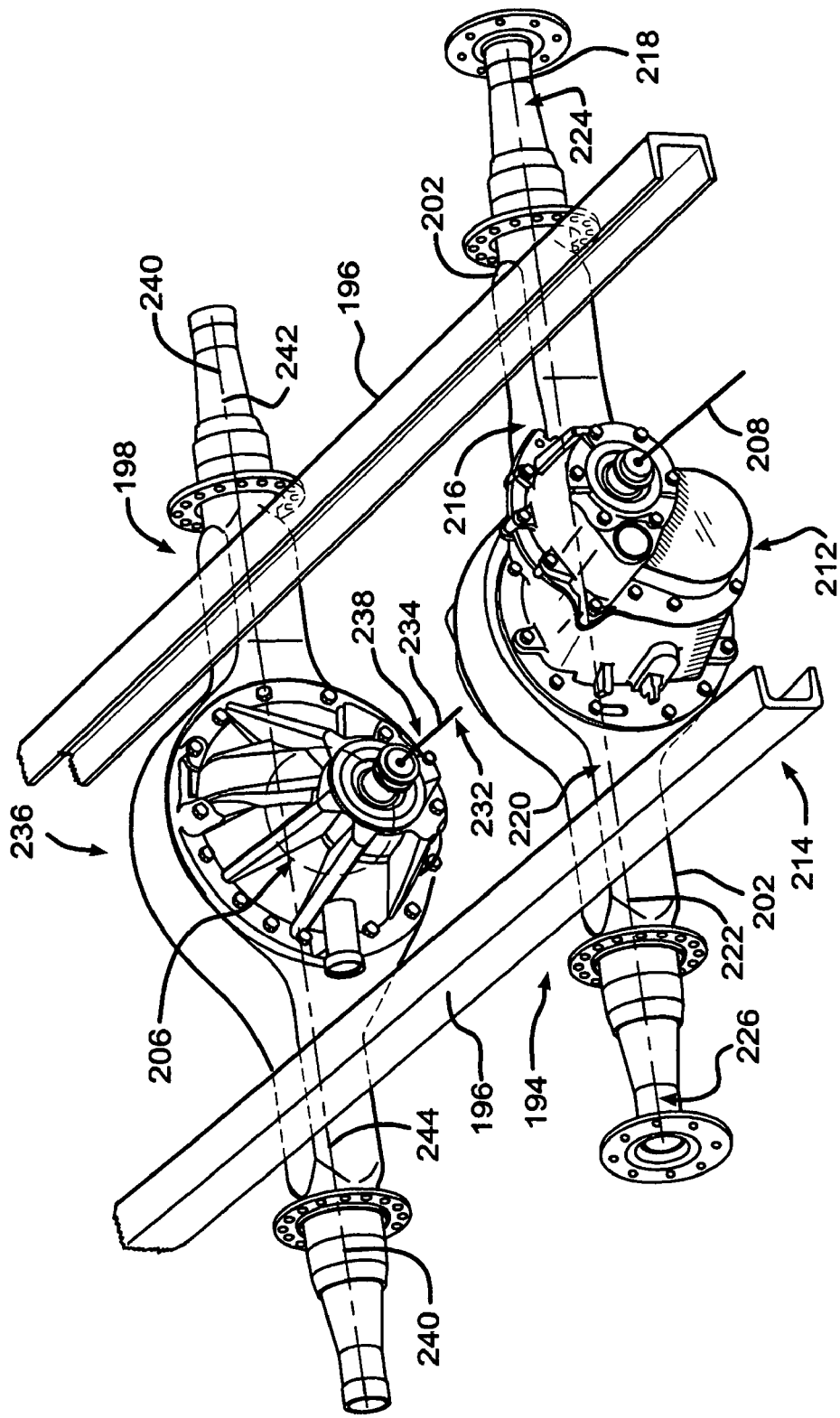
FIG. 10 is a schematic, perspective view of yet another step of the process of the alternative embodiment of the present invention.

The former tag axle system 188, having a forward rear axle differential assembly 212 installed therein, will now be referred to as a forward rear assembly 214 and is depicted as such in FIG. 10. A first end 216 of a first axle shaft 218 is connected to the forward rear axle differential assembly 212 within one radially extending arm 202, as known by those skilled in the art. A first end 220 of a second axle shaft 222 is connected to the forward rear axle differential assembly 212 within the other radially extending arm 202, also as known by those skilled in the art. A second end 224 of the first axle shaft 218 is connected to a first wheel (not shown) and at least one associated tire (not shown). A second end 226 of the second axle shaft 222 is connected to a second wheel (not shown) and at least one associated tire (not shown). The forward rear assembly 214 is installed in the first position 194 on the frame 196.

Figure 5:
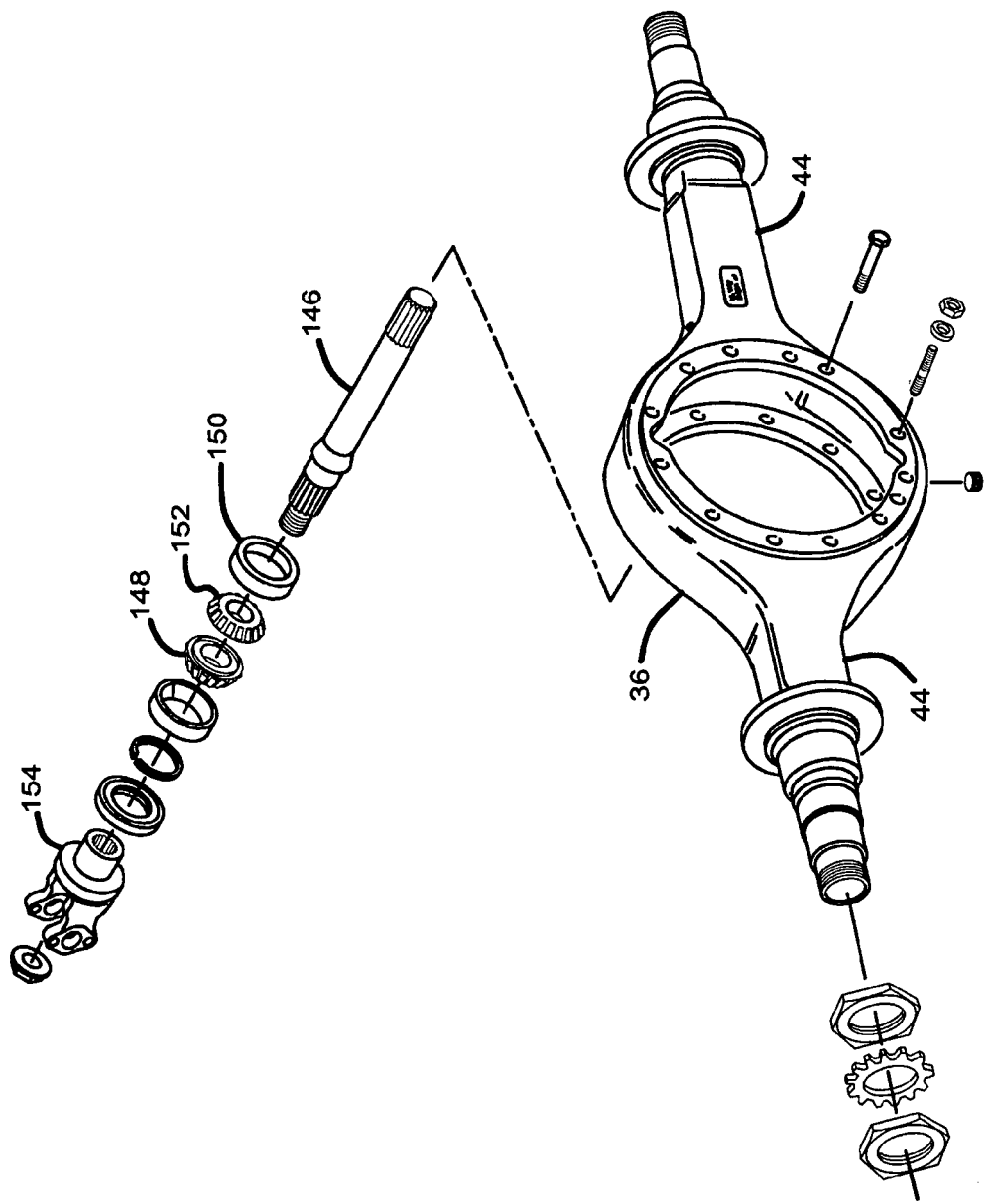
FIG. 5 is an exploded, schematic view of some of the components used to modify the drive axle system of FIG. 2.

An output shaft (not shown) of the forward rear assembly 214 is connected, as described above, to an output yoke (not shown). While the shaft and the yoke are not shown, similar structures are depicted in FIG. 5 at reference numbers 146 and 154 and which are also described above. The output yoke is connected to a first end 232 of an interaxle drive shaft 234.

The former driven axle system 190, removed from the first position 194 on the frame 196, will now be referred to as a rear rear assembly 236, as it is depicted in FIG. 10. The rear rear assembly 236 is installed in the second position 198 on the frame 196. A second end 238 of the interaxle drive shaft 234 is drivingly connected, in a manner known by those skilled in the art, to the differential 206 with the rear rear assembly 236.

While it is preferred to reuse the same differential 206, axle shafts 240 and wheels (not shown) of the rear rear assembly 236, those skilled in the art will appreciate that modifications to one or any of these items can be easily accomplished during the installation of the rear rear assembly 236. Those skilled in the art will also appreciate that suspension bracketing may be secured to either the rear rear assembly 236 or the forward rear assembly 214 as required.

Those skilled in the art will appreciate that based upon the description of the invention above, driving torque from an internal combustion engine (not shown) is transmitted from the rotatable drive shaft 208 and into the forward rear assembly 214. The forward rear axle differential assembly 212 divides the torque and provides a portion of the torque to the first and second axle shafts 218, 222 to drive the wheels (not shown) and tires (not shown) associated therewith. The remainder of the torque is transmitted through the forward rear axle differential assembly 212 to drive the interaxle drive shaft 234. The rotation of the interaxle drive shaft 234 drives the differential 206 of the rear rear assembly 236. The differential 206 of the rear rear assembly 236 provides torque to a first axle shaft 242 and second axle shaft 244 to drive the wheels (not shown and tires (not shown) associated therewith.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A method for converting a non-driven tag axle system to a driven axle system, comprising:

providing a tag axle system and a driven axle system of a tandem axle system, said driven axle system being connected to a rotatably driven shaft;

removing said tag axle system from a rear position on a vehicle frame;

mounting a differential assembly within said tag axle system;

connecting a first axle shaft and a second axle shaft to said differential assembly;

removing said driven axle system from a front position in said vehicle frame;

installing said tag axle system, including said differential assembly and said axle shafts, into said front position in said vehicle frame and attaching said differential assembly to said drive shaft; and installing said driven axle system into said rear position on said vehicle frame and connecting said driven axle system to said differential assembly of said tag axle system.

2. The method of claim 1, wherein said tag axle system has a hollow bowl connecting two hollow, radially extending arms and wherein said first axle shaft and said second axle shaft are located within said arms.

3. The method of claim 1, wherein an interaxle drive shaft connects said differential of said tag axle system in said front position and said driven axle system in said rear position.

4. The method of claim 1, wherein said tag axle system and said driven axle system are substantially similar in exterior profile.

5. A method for converting a non-driven tag axle system to a driven axle system, comprising:

providing a tandem axle system on a vehicle frame comprising a driven leading axle system in a first position and a non-driven tag axle system located behind said driven leading axle system in a second position, said non-driven tag axle system not being drivingly connected to said driven leading axle system;

removing a cover on said non-driven tag axle system and installing a differential within a bowl of said system and installing axle shafts within hollow arms of said system and drivingly connecting said arms to said differential;

removing said driven leading axle system from said first position on said vehicle frame and installing said system in said second position on said vehicle frame;

removing said tag axle system from said second position on said vehicle frame and installing said system in said first position on said vehicle frame; and drivingly connecting said system in said first position on said vehicle frame with said system in said second position on said vehicle frame.

6. The method of claim 5, further comprising removing closures located in said arms of said non-driven tag axle system to install said axle shafts.

7. The method of claim 5, wherein said non-driven tag axle system and said driven leading axle system have bowls and arms that are substantially equal in size and shape.

8. A method for converting a non-driven tag axle system to a driven axle system, comprising:

providing a first axle system in a first position on a vehicle frame, said first axle system lacking a differential system therein;

providing a second axle system in a second position on a vehicle frame, said second axle system having a differential system therein, said second position being forward of said first position on said frame and said second axle system not being in driving connection with said first axle system;

installing a differential system and axle shafts within said first axle system and removing said first axle system from said first position;

removing said second axle system from said second position and installing it on said first position;

installing said first axle system with said differential system and said axle shafts on said second position on said vehicle frame; and connecting said first axle system and said second axle system so that rotational power can be provided from said first axle system in said second position to said second axle system in said first position.

9. The method of claim 8, wherein said first position is rearward of said second position on said vehicle frame.

10. The method of claim 8, wherein said first axle system has a differential bowl and axle shaft arms that have a substantially similar exterior profile to a differential bowl and axle shaft arms of said second axle system.

* * * * *